United States Patent [19]

Hore et al.

[11] Patent Number: 5,521,494
[45] Date of Patent: May 28, 1996

[54] INDUCTIVE DISPLACEMENT SENSOR INCLUDING AN AUTOTRANSFORMER AND AN INDUCTANCE EFFECTING MEANS EXTENDING BETWEEN 90 AND 180 ELECTRICAL DEGREES

[75] Inventors: Donald L. Hore, Sneyd Park; Robert A. Slade, Chattenden, both of Great Britain

[73] Assignee: Radiodetection Limited, Bristol, Great Britain

[21] Appl. No.: 146,189

[22] PCT Filed: May 15, 1992

[86] PCT No.: PCT/GB92/00882

§ 371 Date: Jan. 19, 1994

§ 102(e) Date: Jan. 19, 1994

[87] PCT Pub. No.: WO92/21002

PCT Pub. Date: Nov. 26, 1992

[30] Foreign Application Priority Data

May 17, 1991 [GB] United Kingdom ............... 9110698

[51] Int. Cl.⁶ ............................. G01B 7/14; G01B 7/30
[52] U.S. Cl. ............................. 324/207.16; 324/207.25
[58] Field of Search ............... 324/207.16, 207.17, 324/207.18, 207.19, 207.22, 207.24, 207.25; 318/661, 660, 655, 654; 340/870.32, 870.34, 870.35, 870.36

[56] References Cited

U.S. PATENT DOCUMENTS

| | | | |
|---|---|---|---|
| 4,755,751 | 7/1988 | Ray | 318/661 X |
| 4,991,301 | 2/1991 | Hore | 324/207.25 |
| 5,019,774 | 5/1991 | Rosenberg | 324/207.25 |
| 5,214,378 | 5/1993 | Hore | 324/207.25 |
| 5,300,884 | 4/1994 | Maestre | 318/661 |
| 5,349,293 | 9/1994 | Tanaka et al. | 324/207.22 X |

FOREIGN PATENT DOCUMENTS

| | | |
|---|---|---|
| 0009102 | 4/1980 | European Pat. Off. . |
| 0340317 | 11/1989 | European Pat. Off. . |
| 0401084 | 12/1990 | European Pat. Off. . |

OTHER PUBLICATIONS

Patent Abstracts of Japan, vol. 004, No. 079 (E–014) 7 Jun. 1980 & JP,A,55 046 862 (Okuma Mach Works Ltd) 2 Apr. 1980.

Primary Examiner—Sandra L. O'Shea
Assistant Examiner—Roger Phillips
Attorney, Agent, or Firm—Larson & Taylor

[57] ABSTRACT

An inductive displacement sensor has first and second elements which define a path for movement. The first element has coil portions which interact with an inductance affecting part of the second element so that the inductances of the coil portions vary with movement of the inductance affecting part, only some of the coil portions being affected by the inductance affecting part at any time. The coil portions are arranged in two series connections, each series connection being at least two coil portions electrically connected in series. Coil portions of the two series connections are then arranged alternately. In this way, substantially sinusoidal output signals may be obtained.

9 Claims, 8 Drawing Sheets

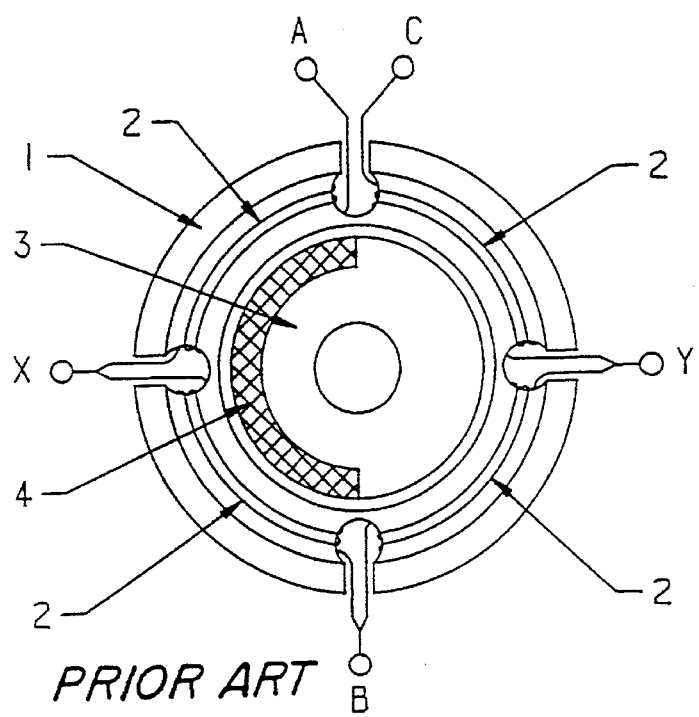
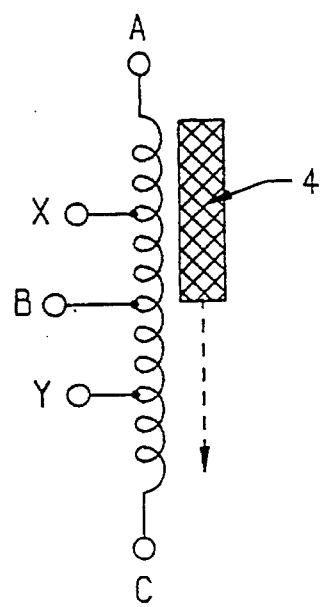
PRIOR ART
FIG. 1
PRIOR ART
FIG. 2
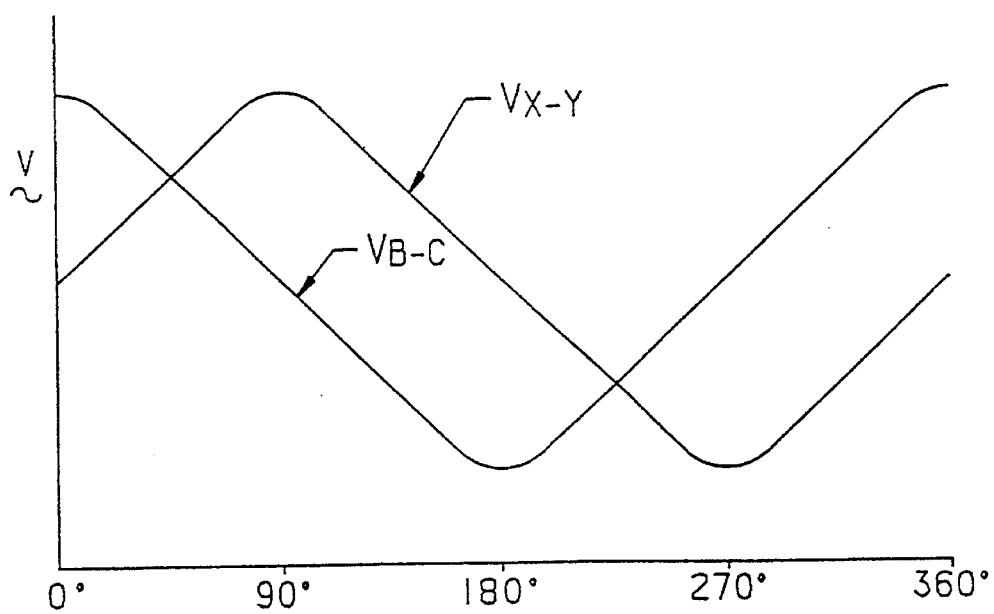
FIG. 3  PRIOR ART

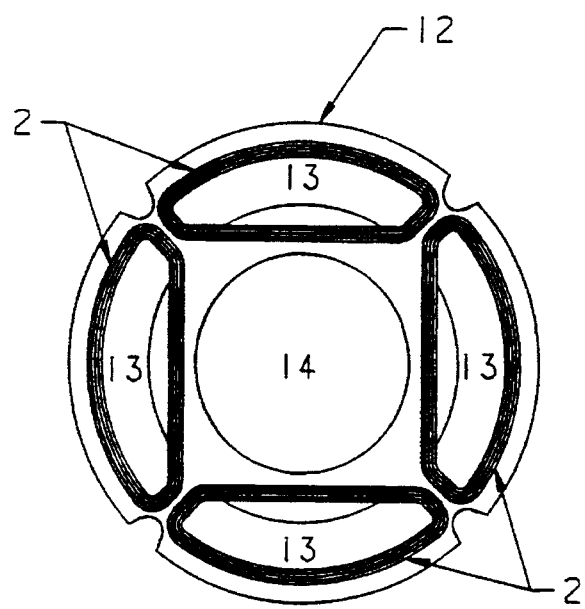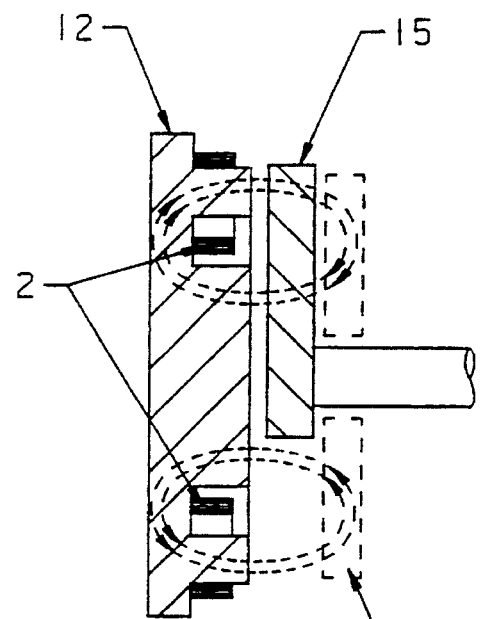
FIG. 11a FIG. 11b
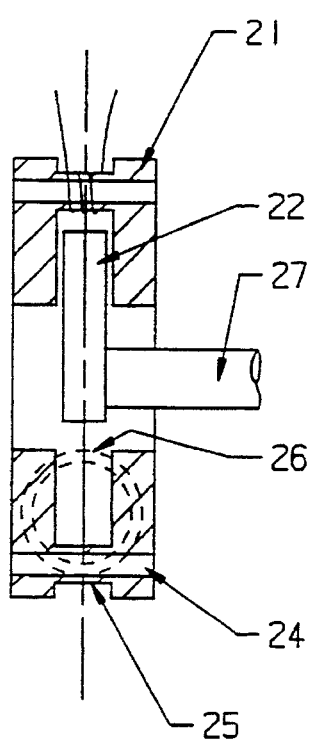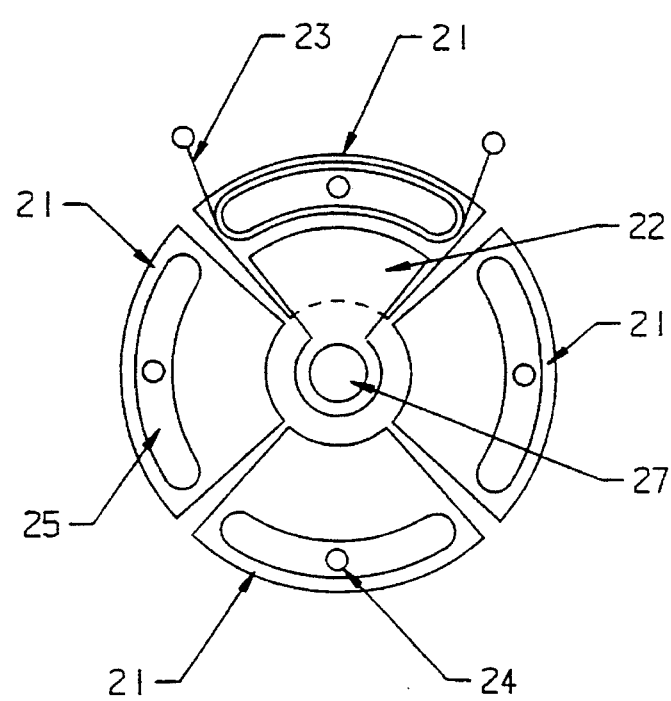
FIG. 12a FIG. 12b

INDUCTIVE DISPLACEMENT SENSOR INCLUDING AN AUTOTRANSFORMER AND AN INDUCTANCE EFFECTING MEANS EXTENDING BETWEEN 90 AND 180 ELECTRICAL DEGREES

BACKGROUND OF THE INVENTION

1. Field of the Invention

The present invention relates to inductive displacement sensors. Such devices may be used for non-contact sensing of either angular or linear displacement.

2. Summary of the Prior Art

The best established non-contact inductive angle sensor for continuous 360° rotation applications is the brushless resolver. It is an inherently complex electrical machine, comprising a multipole wound rotor and stator, with a rotary transformer to couple the excitation a.c. supply to the rotor. There are two stator windings which have voltages induced in them which vary sinusoidally with angle. Being relatively displaced by 90°, they correspond to sine and cosine, from which the shaft angle can be calculated ratiometrically. As this technology originated about the time of World War II for military and naval fire control systems, the sensors and electronic signal processing hardware are well developed. Recent advances have now brought the cost of the electronics much lower, single-chip Resolver-to-Digital converters becoming commonplace. But the resolver itself remains complex and expensive.

We have previously developed alternative forms of sensor, e.g. as disclosed in WO88/06716 and WO90/04153. The former discloses devices employing two members which are relatively displaceable along a linear or circular path. One member provides a plurality of coil portions along the path. Their individual inductances are dependent on the configuration of the second member. For example, the first member may be an annular stator with inward radial projections on which the coil portions are wound, alternatively in different senses so that the flux path tends to loop in and out. The second member may be an annular rotor, one section being ferromagnetic and the other section being non-ferromagnetic and/or having a conductive screening layer. Alternatively the second member may be mercury half-filling an annular conduit which surrounds a static ferromagnetic core. A particular characteristic is that for any relative position of the members, half the coil portions have a different inductance from the other half. Generally the polarity of the coil portions alternate: that is, the array is heteropolar. In contrast WO90/04152 discloses essentially homopolar devices. The devices can be quite similar to the heteropolar analogues. Thus displacement along a linear or rotary path causes relative displacement of a pair of elements that confront each other across the path. One element provides a series of coil portions while the other has a portion which increases the inductance of the fraction of the coil portions that it lies adjacent at any instant. The coil portions are homopolar. Typically each coil portion has an axis which intersects the path, and all are wound in the same sense about their axes. They are generally connected in series as a single winding on a core. The core has unwound portions for providing a flux return path.

Both the hetero- and homopolar devices are designed to give substantially linear outputs over useful working ranges. Clearly, linear outputs are easy to process. In a homopolar angle sensor as disclosed in WO90/04152, the basic output is derived from the centre tap of a single auto transformer winding. The span of the screen or equivalent ferromagnetic rotating element and also the half-winding is 180°. There is inherent rounding of the characteristic at the transition points, but the output is largely linear over 180° rotation. The same is true of devices for reduced angle sensing in which the number of sets of windings and rotor screens is multiplied, e.g. two diametrically opposite 90° screens affecting two pairs of 90° span half-windings give a linear characteristic over 90° rotation.

SUMMARY OF THE INVENTION

The present invention arises from the realisation that useful devices can be provided by working in the opposite direction of development: instead of seeking to minimise the rounding, it is enhanced so that the output becomes substantially sinusoidal. This can then be processed using well-known technology.

Thus the invention concerns a device for sensing displacement along a path, the device comprising a pair of elements that confront each other across the path. One element provides an array of coil portions disposed along the path (their flux axes extending along the path or arranged to cross it; and successive portions being either homopolar or heteropolar). The other element provides a portion that is displaceable relative to the coil portions and affects the inductance of coil portions when it is adjacent to them. The extent of the inductance-affecting portion along the path is selected so that, in use, the signal derivable from the first element varies substantially sinusoidally with the relative displacement of this inductance-affecting portion.

In order to achieve such substantially sinusoidal variation, it is proposed that the coil portions may comprise a first and a second series connection, each series connection having a plurality of coil portions electrically connected in series. Then, coil portions from the two series connections are arranged alternately along the path. Thus, although adjacent coils of one series connection are electrically interconnected, they are physically separated and a coil of the other series connection is located between them, in the direction of the path.

The present invention may be applied to a rotary sensor, in which the pair of elements are a stator and a rotor. Normally, the coil portion will be mounted on the stator but this is not essential. Many stator and rotor geometries are possible, but it is preferable for an annular gap to be defined therebetween, which annular gap then defines the path.

In such an arrangement, and for a four-coil arrangement, the inductance affecting means subtends more than 90° and less than 180° at the centre of rotation of the rotor. Thus, the rotor has assymmetry in effective permeability to alternating flux produced by the stator coils. When one stator coil experiences maximum inductance, the other coil of the same series connection has minimum inductance, whilst the coils of the other series connection have equal median inductance levels. Rotation of the rotor progressively transfers high inductance among the coils in sequence.

Appropriate sinusoidal signals then may be derived from the intermediate connections between the coil portions of the series connections. Then, desirably, the coil portions are connected in a series group or groups arranged so that when half of any group experience maximum inductance the other half experience minimum. The membership of the 'maximum' and 'minimum' group halves do of course change with relative movement of the inductance affecting elements. The voltage between the centre tap and either supply terminal of a group when a.c. fed then varies with relative movement, to produce a brushless variable auto-transformer.

In a rotary device, provision of a second auto-transformer winding displaced 90 electrical degrees from the first will enable a second channel output of the same shape to be derived. This will correspond to the cosine if the first channel corresponds with sine of rotor angle. These two outputs then correspond to those of a conventional resolver, so enabling existing resolver-to-digital converters to be used to demodulate the output signals into angular data.

Such a device can offer considerable advantages over the known brushless resolver devices, in particular, preferred embodiments can offer the following:

1. Extreme simplicity of construction, with no windings on the moving element, and therefore no rotor connections or transformer coupling for brushless operation. An advantage arising from the simplicity is that our resolvers can be made smaller in diameter and length for incorporation in much smaller spaces than the conventional double-wound designs.

2. The possibility of devices with no moving windings, so that there is no moving field. This eliminates a known source of error in resolvers known as 'speed voltage'. This arises because the rotating field from the rotor windings induces voltages in the stator which are related to speed rather than angle.

Of course, the present invention is not limited to rotary sensors, and may be applied to a linear sensor.

Also, it is not necessary, although it is preferable, for the series connections to be connected to a common power source. Where they are connected to a power source, appropriate reference voltages for comparison with the signals derived from the interconnections of the coil portions of the series connections, may be provided by an appropriate bridge circuit connected to the common power supply. That bridge circuit may be based on resistors or coils.

Furthermore, it may be noted that the inductance affecting means may be any previously described, and disclosed in WO88/067167 and WO90/04153.

BRIEF DESCRIPTION OF THE DRAWINGS

Some embodiments of the invention will now be described with reference to the accompanying drawings, in which:

FIG. 1 shows the basic structure of a known type of displacement sensor;

FIG. 2 shows the coil arrangements of the sensor of FIG. 1;

FIG. 3 shows signal outputs from the sensor of FIG. 1;

FIGS. 11a and 11b show plan and sectional views, respectively, of a fourth embodiment of the present invention, based on the use of axial flux;

FIGS. 12a and 12b show plan and sectional views, respectively, of a fifth embodiment of the present invention, being a modification of the embodiment of FIGS. 11a and 11b;

DETAILED DESCRIPTION

Before describing embodiments of the present invention, the basic principles of inductive sensors will be discussed with reference to known arrangements.

Our earlier UK patent specifications GB2 223 590 and 2 241 788 have shown how brushless inductive angle sensing can be achieved using the rotary variable auto-transformer principle, and how two channels of analogue output displaced 90° from each other can be derived from a single wound element serving as both magnetising source and sensing winding. FIG. 1 shows such a device in simple schematic form. A stator of either ferromagnetic or non-conducting material such as plastic supports a minimum of two pairs of coils 2, which are connected in series between a.c. supply terminals A and C. The midpoint is brought out to tap B.

In the absence of a rotor, the coils would act as a simple potential divider, so that voltage across B-C would be half the supply. However, rotor 3 is arranged to present 180° asymmetry in effective permeability to flux developed by coils 2, typically by having 180° of its surface covered by a conducting screen 4, in which eddy currents produce flux opposing that developed by coils 2. Any coils closely coupled to this screen will then display reduced inductance, so that the voltage distribution between the coils will no longer be equal. In the position shown, the inductance of winding section A-B will be lower than B-C, and the volt drop across B-C maximum. Turning rotor 2 clockwise will progressively transfer the lower inductance until the voltage B-C is minimum after 180° rotation; further motion will restore B-C to its original high state at 360°. FIG. 2 shows the circuit schematically, and FIG. 3 shows the analogue output curve B-C, which is virtually linear except for rounding of the transition points at 0° and 180°.

Taps X and Y between the first/second and third/fourth coils respectively are the source of the second channel of output. The voltage between them varies With rotor motion in exactly the same way, but the output source is displaced by 90°, and is shown in FIG. 3 as $V_{X-Y}$ in relation to $V_{B-C}$. Interrogation of both curves by appropriate signal processing electronics can give discrete data over the full 360° rotation.

However, the much earlier development of sinusoidal output sensors such as synchros and resolvers has led to considerable commercial production and availability of signal processing hardware based on sine/cosine rather than linear analogue outputs. It is therefore advantageous to make the rotary variable auto-transformer sensor also capable of giving the option of sine/cosine as well as linear analogue two-channel outputs, to enable it to interface directly with existing systems designed around earlier resolver technology, and this is the subject of this invention.

Figure 4:
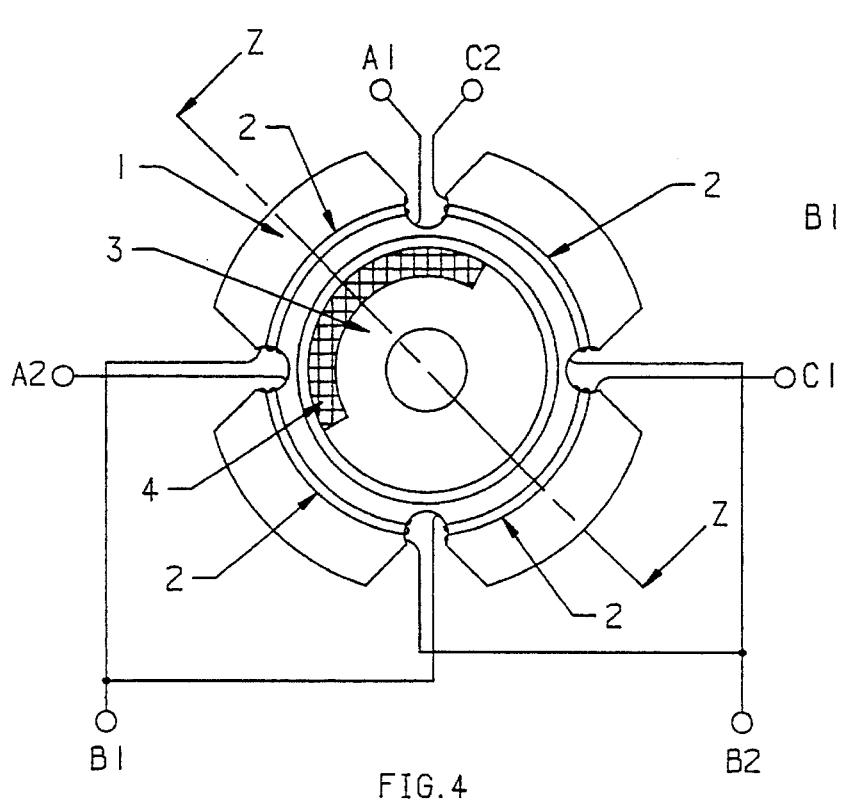
FIG. 4 shows an inductive displacement sensor being a first embodiment of the present invention.

FIG. 4 shows an embodiment of the present invention, being a rearrangement of the FIG. 1 device, in which instead of connecting all four coils 2 in series, they are connected as two separate diametrally opposed pairs, each with centre tap brought out to provide the auto-transformer output. Two are connected to terminals A1 and C1 with tap B1, and the other pair to terminals A2 and C2 with tap B2, as again shown in diagram form in FIG. 5. Because the paired coils are further displaced from each other than in FIG. 1, the output characteristic is much less linear, becoming quasi-sinusoidal as shown in FIG. 6. If connected across a common a.c. supply, the two outputs $V_{B1-C1}$ and $V_{B2-C2}$, being displaced by 90°, approximate to the sin/cos output of a conventional resolver.

By appropriate dimensioning of the rotor screen length in relation to stator coil span, the output curves $V_{B1-C1}$ and $V_{B2-C2}$ can be made to give a very close match to true sine/cosine functions, thus enabling existing resolver-to-digital signal processing circuits to be utilised, to economic advantage in many instances where digitised 360° information is required. Thus, the screen 4 subtends more than 90° and less than 180° at the centre of the rotor 3.

Figure 7:
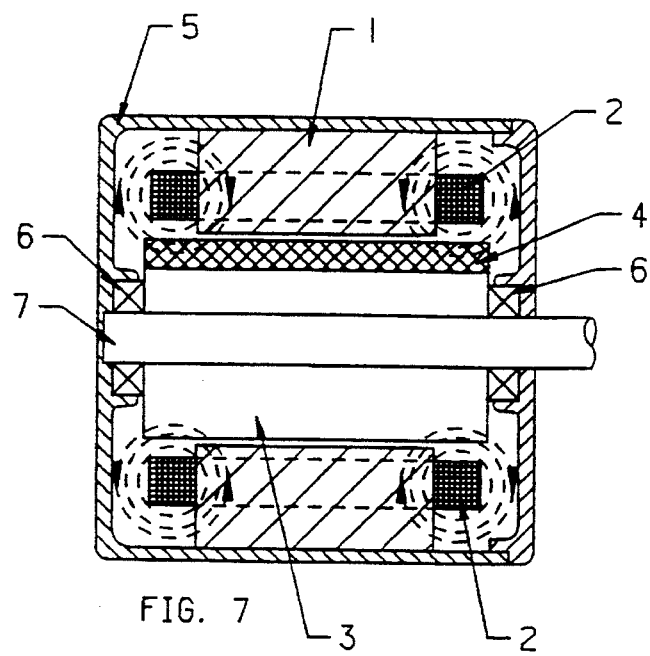
FIG. 7 is a sectional view along the line Z to Z in FIG. 4.

The practical design embodiments of this invention can take many forms, according to whether the coils are arranged to present all the same polarity (homopolar), or alternate polarities (heteropolar). The simple construction is based directly on FIG. 4, and FIG. 7 shows a practical embodiment corresponding to the cross section Z—Z of FIG. 4, in a suitable outer housing 5 with bearings 6 and shaft 7.

In this case, the stator 1 is of plastic or other suitable non-magnetic non-conducting material, and simply serves to hold coils 2 in their correct relative positions. As a result, the open slots of the stator 1 enable the coils 2 to be preformed and simply potted in place. The flux produced by them links the end of the rotor as indicated by the arrowed circles of broken lines. If they link ferromagnetic rotor material, the coils have higher inductance than those linking conducting screen 4, so turning rotor 3 will produce the output voltage variation already described.

Figure 8:
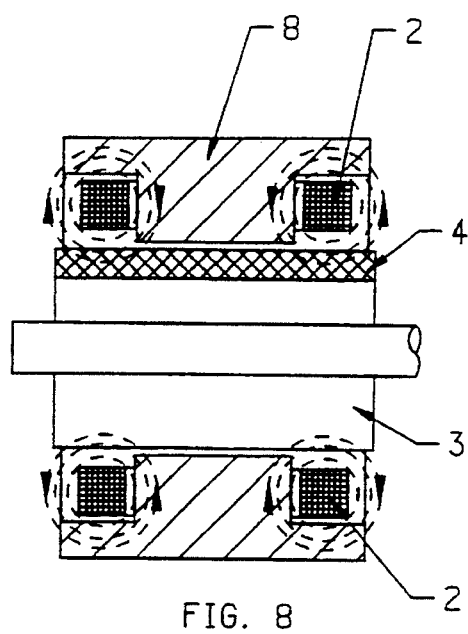
FIG. 8 shows a second embodiment of the invention, being a modification of that of FIGS. 4–7.

Use of simple air-cored coils like this confers advantages in eliminating errors due to variations of core permeability or dimensional tolerances when ferromagnetic stators are used. However, there are practical limitations in minimum size and operating frequency, so that the use of ferromagnetic cores may be necessary. This increases the flux level and the signal-to-noise ratio, and FIG. 8 shows a similar coil formation, again in homopolar configuration, in a ferromagnetic stator 8. In FIG. 8 the housing, shaft and bearings have been omitted for clarity. It will be apparent that much more of the flux path around coils 2 is in ferromagnetic material, with consequent flux enhancement. The overhang of stator 8 at each end also serves to increase the area of magnetic material coupling the flux across the radial air-gap to each end of the rotor, the magnetic circuit being effectively double-ended (end elevation as FIG. 1).

Figure 9A:
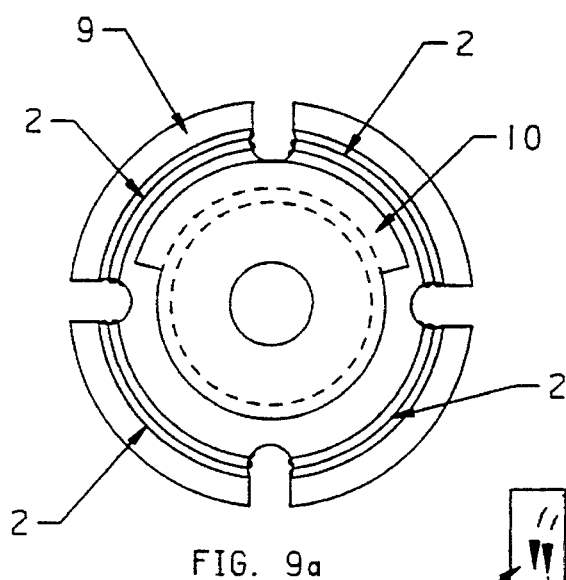
FIGS. 9a and 9b show plan and sectional views, respectively, of a single-ended sensor, being a third embodiment of the present invention.
Figure 9B:
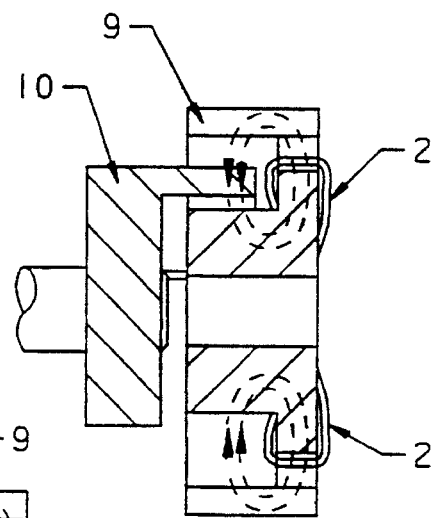
Figure 10:
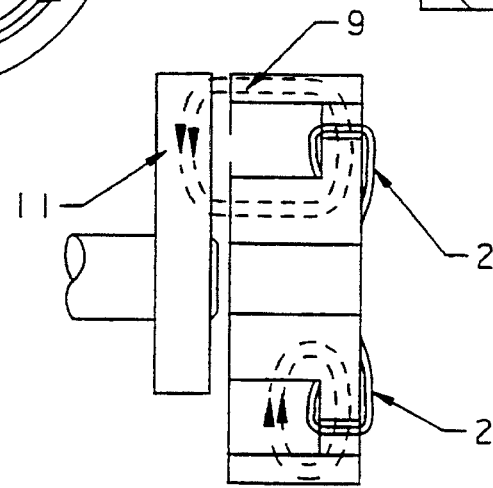
FIG. 10 shows a sectional view of an embodiment being a modification of the embodiment of FIGS. 9a and 9b.

FIGS. 9a and 9b show a single-ended variation of the same homopolar coil configuration, using a ferromagnetic stator of pot-core shape 9. In this embodiment, there is no rotating ferromagnetic core, the central boss of the stator serving the same purpose in returning the flux. The rotor 10 then becomes either a conducting screen of appropriate span to obstruct flux traversing the single radial air-gap, or else a ferromagnetic part to enhance, instead of obstruct, the flux. A further option with this stator is to have the rotor axially spaced from the face as shown in FIG. 10, but this layout is more sensitive to errors arising from axial displacement of the shaft due to bearing tolerances. For maximum sensitivity in this arrangement, the rotor 11 is ferromagnetic, of appropriate shape to produce the required sinusoidal characteristics.

FIGS. 11a and 11b show another axial-flux embodiment. Stator 12 supports the four face coils 2 on raised pads 13. If ferromagnetic material is used for the stator, a central boss provides a return path for the flux. The rotor 15 may be of ferromagnetic or metallic screening material of appropriate shape, and the flux may be further enhanced if required by a ferromagnetic backing ring 16. Alternatively, a duplicate wound stator 12 can be fixed facing the other, with coils connected to be mutually assisting the passage of flux across the gap in which the rotor revolves. If required, the second set of stator coils can be connected to provide a differential bridge output configuration which will be described later.

FIGS. 12a and 12b show in principle how the design can be adapted readily To another magnetic circuit layout with axial air-gap.

The stator assembly comprises four facing pairs of segments 21 of suitable ferromagnetic material so shaped as to provide inner abutments 25 on which there are carried the windings 23, the flux from which crosses the axial air-gap between the segments as indicated by broken lines at 26. Rotating in the air-gap is flux affecting member 22 attached to the input shaft 27. Member 22 may be either of high conductivity non-magnetic material, or of high permeability ferromagnetic material, as previously explained. The stator assembly may be attached to a suitable housing by screwholes 24. The assembly may comprise eight individual segments joined in pairs face-to-face, or four separately moulded quadrants each of which presents a pair of segments 21, or otherwise constituted to suit manufacture so as to make up such an assembly.

The individual pole windings are connected to form two series-connected diametrally opposed pairs, one pair providing sine and the other cosine output. This will give one full cycle of output per turn. It will be appreciated that by doubling the number and halving the angular span of the segments, two 360 electrical degree cycles per turn will result, and so on for each addition of four poles per cycle.

Figure 13:
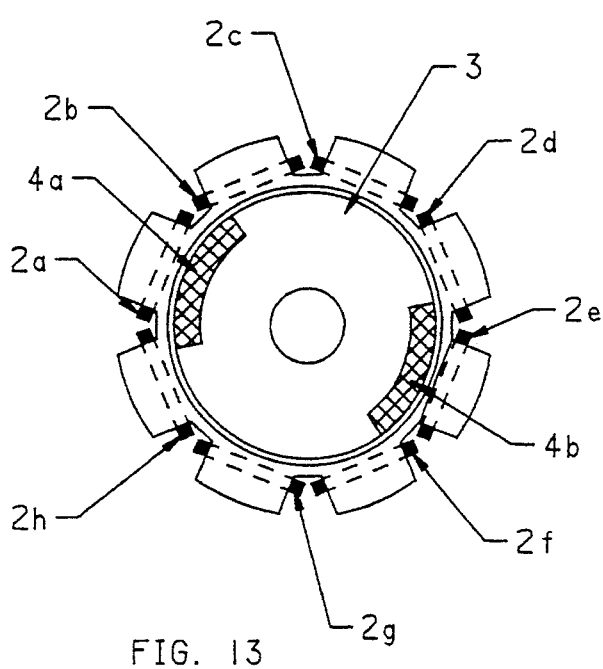
FIG. 13 shows a sixth embodiment of the present invention, for generating one cycle for every 180° of mechanical rotation.
Figure 14:
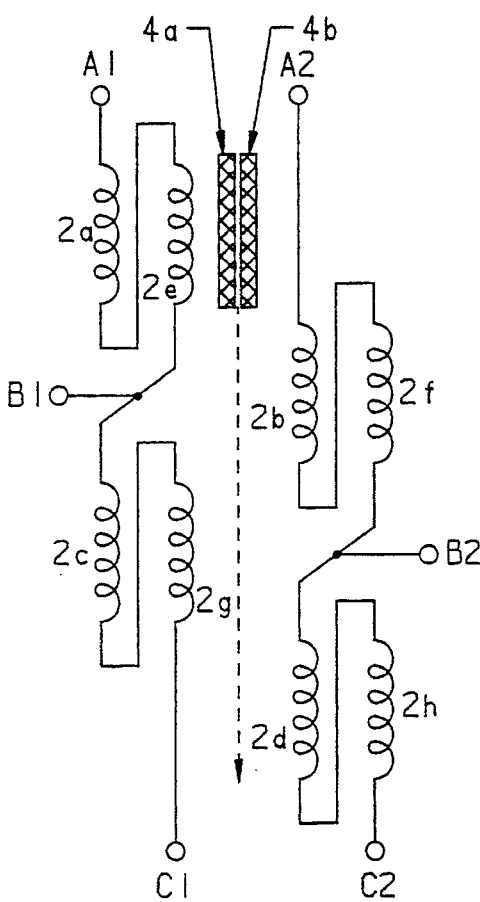
FIG. 14 shows the electrical interconnection of the coils of the embodiment of FIG. 13.
Figure 15:
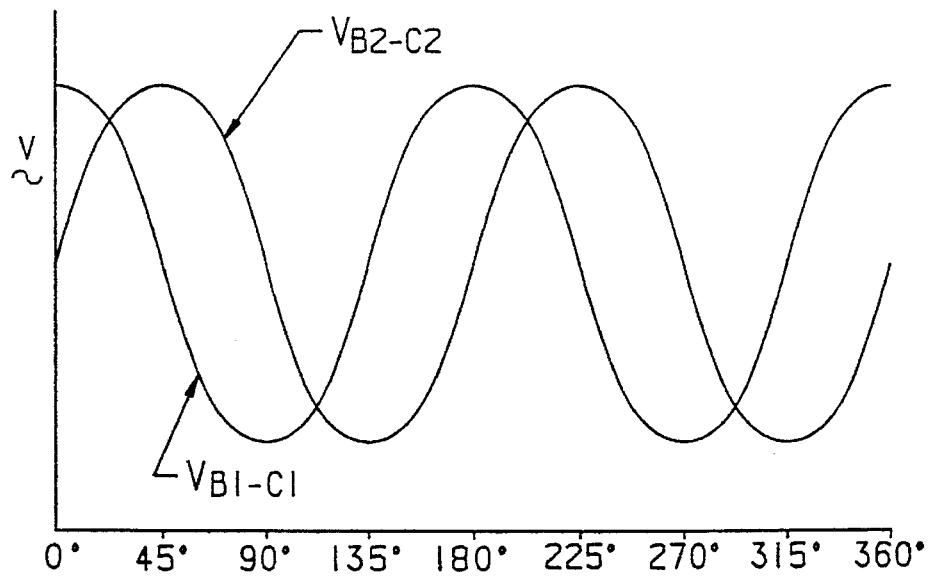
FIG. 15 shows typical output signals of the embodiment of FIG. 13.

In all illustrations so far, the degrees of electrical traverse have corresponded with degrees of mechanical rotation. As in most conventional multiple electrical machines, doubling the number of poles can halve the mechanical degrees relative to one electrical cycle of output. FIG. 13 shows how the basic format of FIG. 4 may be altered to give one complete electrical cycle of output for every 180° of mechanical rotation, i.e. two output cycles per revolution, by way of example. In this embodiment stator 1 carries eight instead of four identical coils 2a–2h, while rotor 3 carries two diametrally opposed conducting screens 4a, 4b of about half the span of screen 4 in FIG. 4. FIG. 14 is the coil connection arrangement for FIG. 13 which corresponds with FIG. 5 in relation to FIG. 4. With rotor 3 in the position shown in FIG. 13, two diametral coils 2a and 2e are influenced by the proximity of screens 4a and 4b respectively, and are connected in series as one half of an auto-transformer between supply terminals A1 and C1, the other half being coils 2c and 2g in series on the other side of tap B1. Only 90° clockwise rotation is required to transfer the screening to coils 2c, 2g, instead of 180° in FIGS. 2 and 5. Similarly coils 2b, 2f and 2d, 2h form the second auto-transformer between terminals A12, B2 and C2, and the outputs from B1 and B2 are now displaced by 45° mechanical, 90° electrical from each other. FIG. 15 shows the resulting two output cycles per 360° turn.

It will be obvious that similar multiplication of quadruple coil groups by three, four and so on, with associated multiplication of appropriately reduced span screens, will further reduce the mechanical rotation per 360° electrical cycle to 120°, 90° and so on pro-rata.

Figure 16:
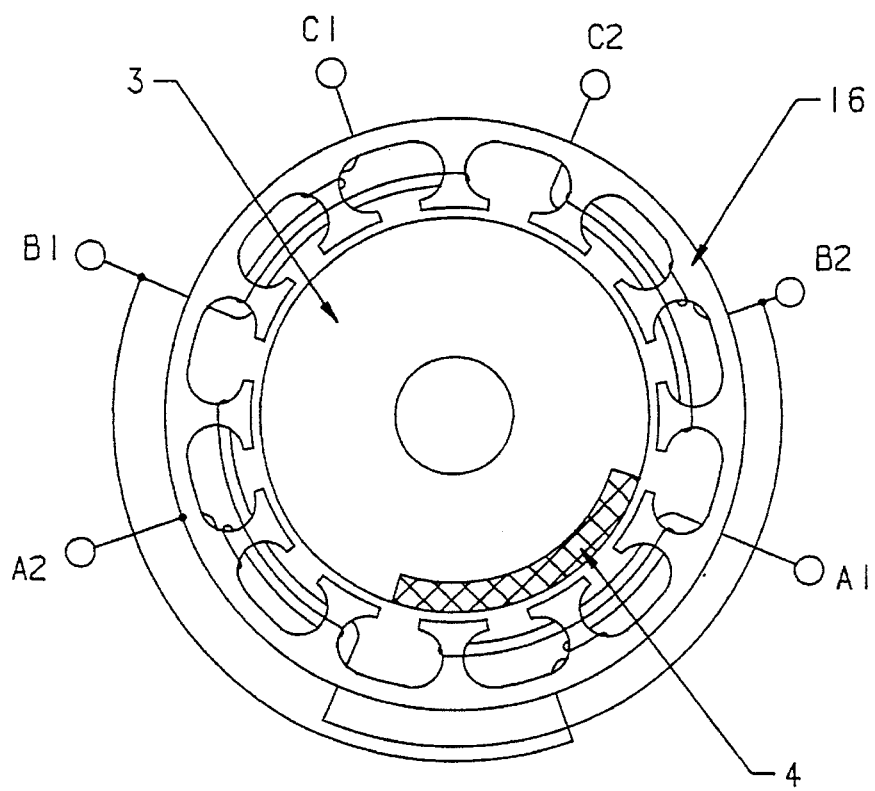
FIG. 16 shows a seventh embodiment of the present invention, based on heteropolar excitation.

When such increased numbers of coils are used, there may be advantages in utilising heteropolar as opposed to homopolar excitation. Homopolar magnetic circuits are by their nature three-dimensional, requiring flux paths in both radial and axial directions. With heteropolar excitation, alternate coils are wound with opposite polarity, so that each acts as a return path for flux developed by its neighbours. As a result, the flux path is two-dimensional, which suits constructions using punched lamination stacks for stator and/or rotor. FIG. 16 shows one such arrangement by way of example.

The embodiment of FIG. 16 is a four-coil arrangement corresponding to FIG. 4, except that each coil is distributed over three slots of a 12-slot stator. As with conventional electrical machines, the winding distribution can be arranged to optimise the sinusoidal nature of the output, in conjunction with the dimensioning of the rotor screen 4. This may also be skewed relative to the stator if required to smooth out non-linearities.

While the embodiment of FIG. 16 gives one electrical cycle output per 360° turn, it will be apparent that multiplication of stator slots and coils, together with equivalent multiplication of rotor screens, or equivalent permeability asymmetry, will enable multiple electrical cycles of output per turn to be achieved. Another way of using such multiple sets of coils, as exemplified by the FIG. 13 embodiment, is to divide them into two separate sets to give duplicated sine/cosine functions into separate electronic signal processing circuits, in order to give redundancy for security of output data.

Figure 17:
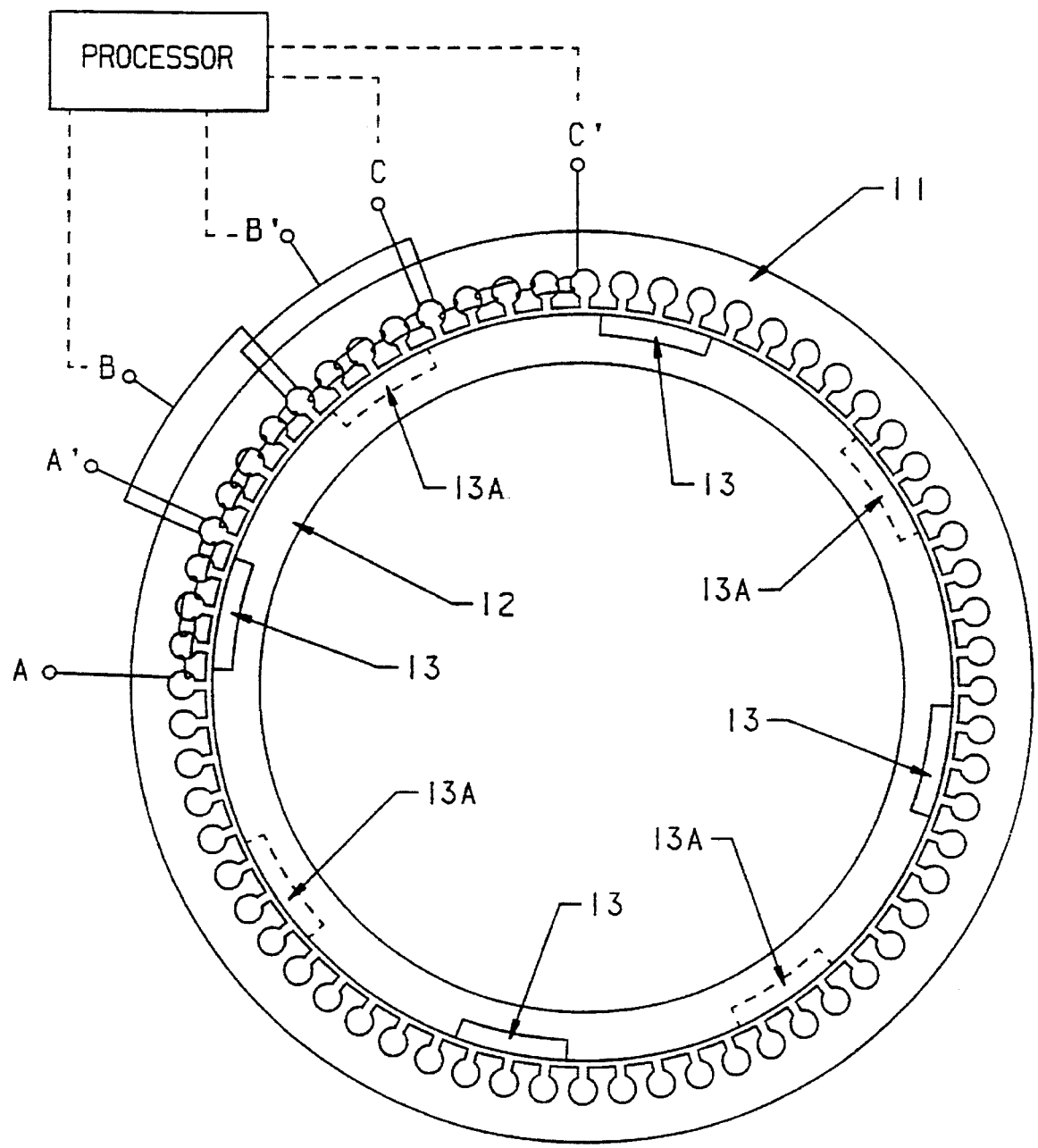
FIG. 17 shows an eighth embodiment being a further heteropolar arrangement.

A further example of the embodiment of the sine/cosine output design in a heteropolar multipole format is shown in FIG. 17. This typifies an application to a rotating shaft of large diameter, e.g. a machine tool spindle drive, in which the number of output cycles per revolution is matched to the pole structure of the driving motor, in this case four cycles.

An internally toothed stator 11, typically of steel laminations, has 64 slots, thus defining 64 radially projecting poles. Each quadrant embraces a full cycle of output i.e. 360° electrical, and carries identical windings. A possible winding pattern is shown schematically for one quadrant (16 poles). The poles are wound in series groups of four, with groups alternated to give two pairs displaced by 22½° natural, 90° electrical. The first pair has supply terminals A and C, with midpoint tap B. The second pair has supply terminals A' and C', mid-point tap B'. These pairs are connected in series with identical windings on the other quadrants. The rotor carries four directional elements 13 which are either conducting screens in an otherwise ferromagnetic rotor, or ferromagnetic arcs in an otherwise non-magnetic structure. It will be seen that these elements in the position shown have maximum coupling to winding section A-B, which will be of either minimum or maximum inductances according to the conducting or magnetic nature of element 13, with corresponding minimum or maximum output voltage across B-C. Meanwhile, element 13 has minimal effect on winding A' B' C', so that output voltage B'C' will be half the supply.

Rotation clockwise will bring element 13 into maximum coupling with A'B', and equalise the inductances of AB and BC to produce mid-value output across BC. Further rotation to the position dotted as 13A maximises the coupling to section B-C to give the opposite output condition to the starting point, while a further 22½° completes the output cycle of B-C. It will be apparent that the output cycle from B'C' will be similar but displaced 90° electrical.

By making elements 13 of shorter span than for our previous linear-output sensors, together with appropriate shaping and winding distribution, a close approximation to sine/cosine characteristics can be derived (e.g. FIG. 3).

Figure 18:
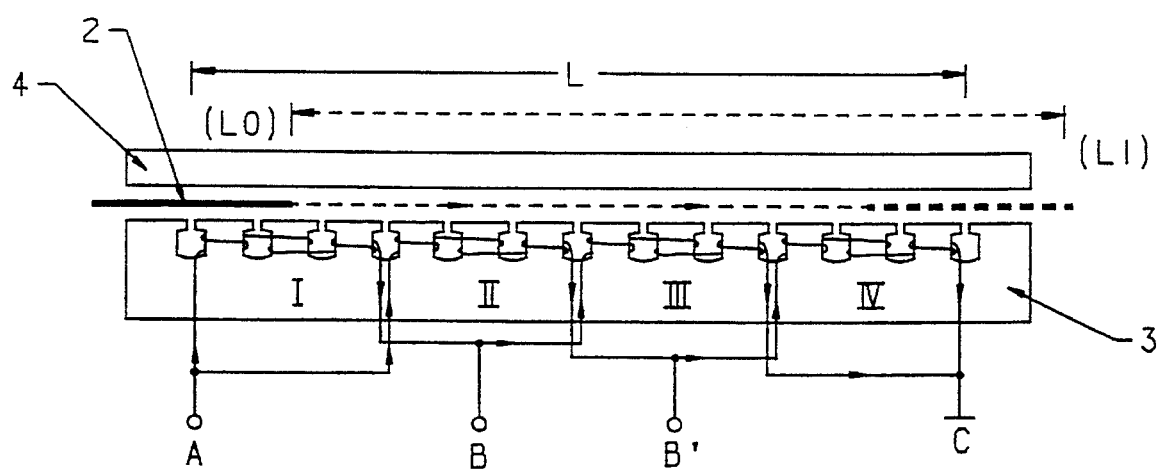
FIG. 18 shows a ninth embodiment being a linear inductive displacement sensor.

The obtaining of sine/cosine characteristics is similarly feasible for linear versions of the sensor. Thus an arrangement corresponding to FIG. 18 with shortened screen span and appropriate shaping and winding could produce two channels of sine/cosine analogue outputs.

In any design in which coils are duplicated, e.g. in the FIG. 13 embodiment, or by bifilar winding of single coils, it is possible to connect them in bridge formation to give a differential output.

Figure 5:
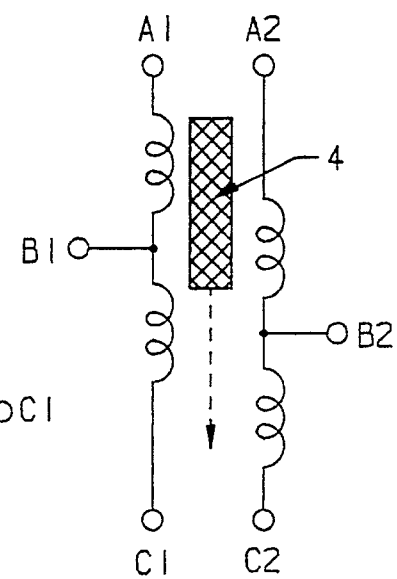
FIG. 5 shows the coil arrangements in the sensor of FIG. 4.
Figure 6:
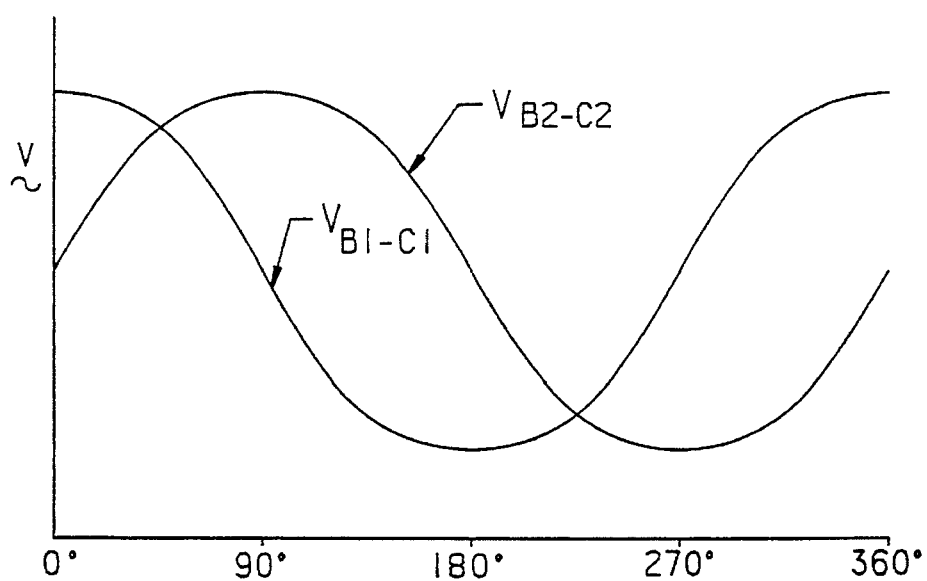
FIG. 6 shows typical output signals from the inductive displacement sensor of FIG. 4.
Figure 19:
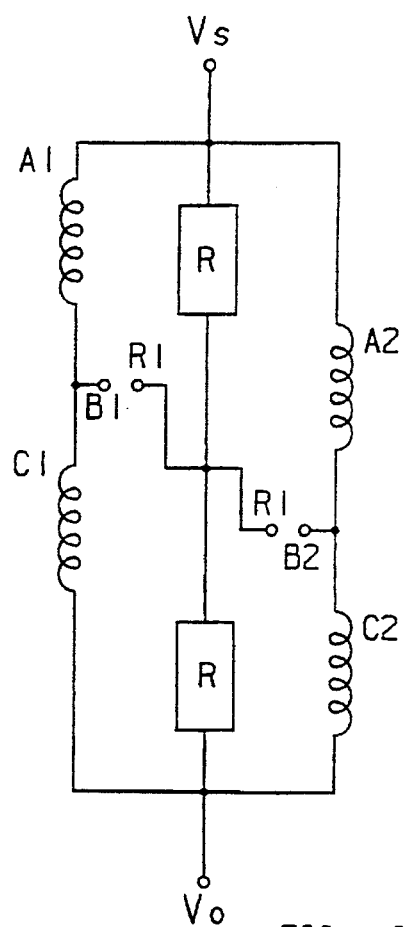
FIG. 19 shows a further embodiment, making use of a resistor-based bridge circuit.

Bridge connection with single coils can be achieved using matched resistor pairs as shown in FIG. 19, with reference to FIGS. 4 and 5. The voltage levels at taps B1 and B2 are compared with the mid-rail voltage level at the centre tap R1 of the matched resistor pair R, coil and resistor pair being connected in parallel to a common a.c. supply Vs-Vo. Again, the result is a pair of quasisinusoidal outputs displaced 90° from each other, in which the extremes of amplitude are in-phase and anti-phase, while the mid-point is a null.

Figure 20:
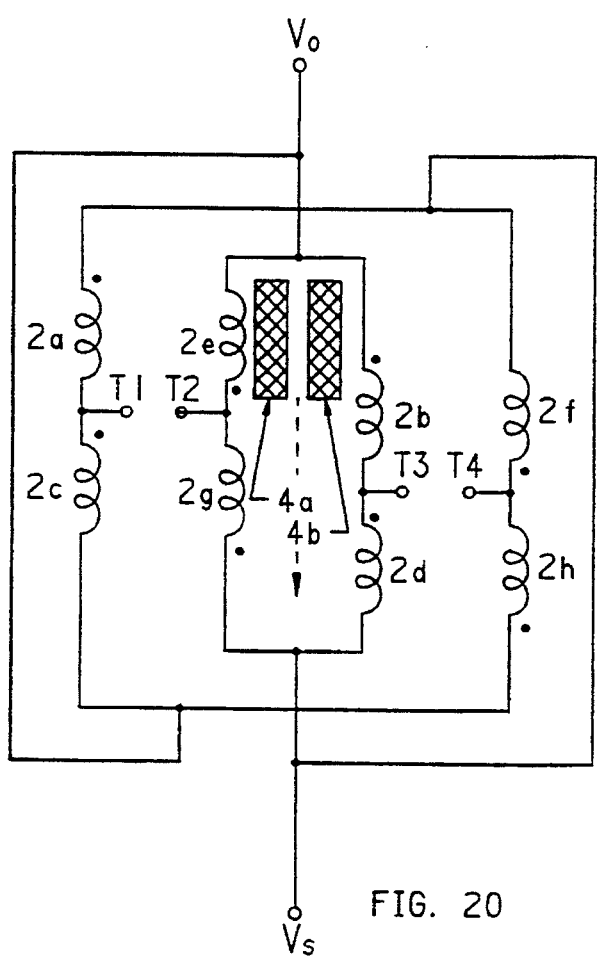
FIG. 20 shows an embodiment corresponding to FIG. 19 but using a coil-based bridge circuit.
Figure 21:
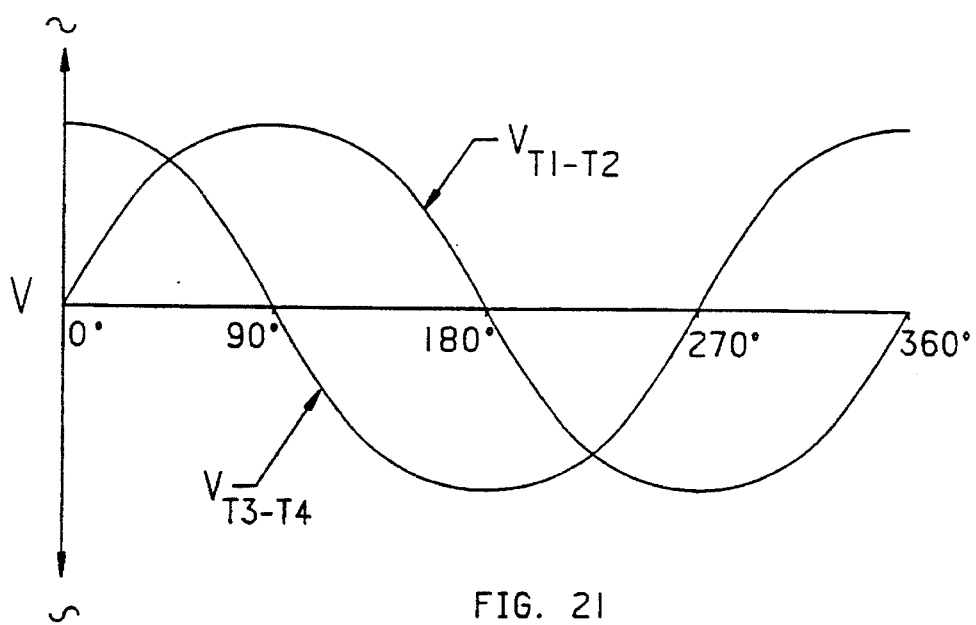
FIG. 21 shows typical output signals from the embodiment of FIG. 20.

A further alternative is shown in FIG. 20. Coil pairs 2a, 2c form a bridge with coil pair 2e, 2g, connected in such a way that, when screen 4a reduces the impedance of coils 2a and 2e, the voltage level at T1 tends towards Vs, while the level at T2 tends towards Vo. When screen 4a reaches the mid-position, voltage levels at T1 and T2 are equal, giving a null output. When 2c and 2g are reached by the screen, the voltage differential is in the opposite phase sense. This effect is replicated at T3 and T4 with 90 electrical degrees phase shift. The result is a pair of quasi-sinusoidal output curves shown in FIG. 21, in which the modulation is in both amplitude change and phase reversal.

We claim:

1. An inductive displacement sensor for providing electrical output data relating to displacement along a path, said sensor comprising first and second elements, which extend along the path on respective sides and confront each other across said path; said first element having a plurality of coil portions disposed along the path; said second element comprising inductance affecting means, extending along the path, for affecting the inductance of at least one coil portion in an adjacent affected region of said first element, said inductance affecting means being arranged so that at any given time, only some of the coil portions of the first element are in the affected region; said inductance affecting means being displaceable relative to said first element, and the relative displacement effectively displacing said affected region so that said affected region applies to a spatially varying fraction of the coil portions; and said coil portions consisting of first and second series connections, each of said first and second series connections having at least two of said coil portions electrically connected in series therein, and disposed to act as an autotransformer, serving for both magnetization and sensing, and with coil portions of said first and second series connections alternating along the path; the length of the inductance affecting means extending along the path being such that the inductance affecting means affects coil portions over a range of more than 90 electrical degrees and less than 180 electrical degrees; whereby signals derivable from said first element vary substantially sinusoidally with the relative displacement of the inductance affecting portion.

2. A sensor according to claim 1, wherein said second element is rotatable relative to said first element.

3. A sensor according to claim 2, wherein an annular gap is defined between an inner periphery of said first element and an outer periphery of said second element, and said path extends around said annular gap; said inductance affecting means subtending more than 90 electrical degrees and less than 180 electrical degrees at the axis of rotation of said second element.

4. A sensor according to claim 2, wherein said first element has a channel therein defining said path.

5. A sensor according to claim 4 wherein said inductance affecting means extends into said channel.

6. A sensor according to claim 4, wherein said channel has a mouth and said inductance affecting means is movable proximate the mouth of said channel.

7. A sensor according to claim 1, wherein each of said first and second series connections has at least four of said coil portions, and said inductance affecting means has first and second parts arranged to affect the inductance of two of said four of said coil portions of one said first and second series connections at any time.

8. A sensor according to claim 1, wherein said path is linear.

9. A sensor according to claim 1 having a common source, and wherein said first and second series connections are connected in parallel to said common power source.

* * * * *